United States Patent
Chang et al.

(10) Patent No.: US 9,571,810 B2
(45) Date of Patent: Feb. 14, 2017

(54) METHOD AND APPARATUS OF DETERMINING PERSPECTIVE MODEL FOR DEPTH MAP GENERATION BY UTILIZING REGION-BASED ANALYSIS AND/OR TEMPORAL SMOOTHING

(75) Inventors: Yu-Lin Chang, Taipei (TW);
Chao-Chung Cheng, Tainan (TW);
Te-Hao Chang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 351 days.

(21) Appl. No.: 13/587,917

(22) Filed: Aug. 16, 2012

(65) Prior Publication Data

US 2013/0162631 A1 Jun. 27, 2013

Related U.S. Application Data

(60) Provisional application No. 61/579,669, filed on Dec. 23, 2011.

(51) Int. Cl.
*G06T 15/00* (2011.01)
*H04N 13/00* (2006.01)
(Continued)

(52) U.S. Cl.
CPC ......... *H04N 13/0022* (2013.01); *G06T 7/0061* (2013.01); *H04N 13/026* (2013.01);
(Continued)

(58) Field of Classification Search
None
See application file for complete search history.

(56) References Cited

U.S. PATENT DOCUMENTS

| 5,917,937 A | 6/1999 | Szeliski |
| 6,584,219 B1 * | 6/2003 | Yamashita et al. ........... 382/154 |

(Continued)

FOREIGN PATENT DOCUMENTS

| CN | 1495676 A | 5/2004 |
| CN | 102098526 A | 6/2011 |

(Continued)

OTHER PUBLICATIONS

Harman, Rapid 2D to 3D Conversion, Stereoscopic Displays and Virtual Reality Systems IX, vol. 4660, pp. 78-86, 2002.
(Continued)

*Primary Examiner* — Kee M Tung
*Assistant Examiner* — Yi Wang
(74) *Attorney, Agent, or Firm* — Winston Hsu; Scott Margo

(57) ABSTRACT

A method for generating a target perspective model referenced for depth map generation includes at least following steps: receiving a first input image; utilizing a region-based analysis unit for analyzing a plurality of regions in the first input image to extract image characteristics of the regions; and determining the target perspective model according to at least the image characteristics. Another method for generating a target perspective model referenced for depth map generation includes: receiving a first input image; determining a first perspective model in response to the first input image; and utilizing a perspective model generation unit for generating the target perspective model by a weighted sum of the first perspective model and at least one second perspective model.

27 Claims, 10 Drawing Sheets

(51) Int. Cl.
*G06T 7/00* (2006.01)
*H04N 13/02* (2006.01)

(52) U.S. Cl.
CPC .............. *G06T 2207/20021* (2013.01); *H04N 2013/0081* (2013.01)

(56) References Cited

U.S. PATENT DOCUMENTS

| | | | |
|---|---|---|---|
| 8,606,043 B2 | 12/2013 | Kwon | |
| 2005/0053276 A1 | 3/2005 | Curti | |
| 2007/0159476 A1* | 7/2007 | Grasnick | 345/419 |
| 2009/0196492 A1* | 8/2009 | Jung et al. | 382/154 |
| 2010/0080448 A1* | 4/2010 | Tam et al. | 382/154 |
| 2011/0044531 A1* | 2/2011 | Zhang et al. | 382/154 |
| 2011/0096832 A1* | 4/2011 | Zhang et al. | 375/240.08 |
| 2011/0188780 A1 | 8/2011 | Wang | |
| 2011/0199458 A1 | 8/2011 | Hayasaka | |
| 2011/0273531 A1 | 11/2011 | Ito | |
| 2012/0039525 A1 | 2/2012 | Tian | |
| 2012/0169847 A1* | 7/2012 | Lee et al. | 348/46 |
| 2013/0095920 A1 | 4/2013 | Patiejunas | |

FOREIGN PATENT DOCUMENTS

| | | |
|---|---|---|
| CN | 102104786 A | 6/2011 |
| CN | 102117486 A | 7/2011 |
| WO | 2011017310 A1 | 2/2011 |
| WO | 2011104151 A1 | 9/2011 |

OTHER PUBLICATIONS

Murata, A Real-Time 2-D to 3-D Image Conversion Technique Using Computed Image Depth, vol. 29, Issue 1, pp. 919-922, 1998 SID.

Angot, A 2D to 3D video and image conversion technique based on a bilateral filter, vol. 7526, pp. 75260D-1-75260D-10, 2010 SPIE-IS&T.

* cited by examiner

_US 9,571,810 B2_

METHOD AND APPARATUS OF DETERMINING PERSPECTIVE MODEL FOR DEPTH MAP GENERATION BY UTILIZING REGION-BASED ANALYSIS AND/OR TEMPORAL SMOOTHING

CROSS REFERENCE TO RELATED APPLICATIONS

This application claims the benefit of U.S. provisional application No. 61/579,669, filed on Dec. 23, 2011 and incorporated herein by reference.

BACKGROUND

The disclosed embodiments of the present invention relate to depth map generation, and more particularly, to a method and an apparatus of determining a perspective model by utilizing region-based analysis and/or temporal smoothing.

Since the success of the three-dimensional (3D) movie such as Avatar, the 3D playback has enjoyed growing popularity. Almost all the television (TV) manufacturers put 3D functionality into their high-end TV products. One of the important required 3D techniques is 2D-to-3D conversion, which converts the traditional two-dimensional (2D) videos into 3D ones. It is important because most contents are still in the traditional 2D format. For a 2D monocular video input, objects and their geometry perspective information are estimated and modeled, and then a depth map is generated. With the produced depth map, depth image based rendering (DIBR) may be used to convert the original 2D monocular video into stereoscopic videos for the left and right eyes, respectively. In such a conventional processing flow, the most important issue is how to generate the depth map.

In order to correctly generate the depth map of the input 2D video, various cues are applied to estimate the depth information. Many conventional depth map generation methods are proposed to retrieve the depth map using different combinations of those depth cues. The perspective information is considered to generate an initial perspective/global depth map. Most of the conventional methods need an initial perspective/global depth map which represents the perspective view of a scene. However, the conventional initial depth map often provides only bottom-top perspective, which does not always represent the perspective of the environment, so vanishing line or feature point is required to model a more complex perspective of the environment. One conventional algorithm may carry out the vanishing line/feature point detection by Hough transform. However, it requires a time demanding and computational intensive full frame pixel operation. Regarding other conventional algorithms, they often produce instable vanishing line/feature point which jumps between frames, resulting in judder perceived on the created depth map.

SUMMARY

In accordance with exemplary embodiments of the present invention, a method and an apparatus of determining a perspective model by utilizing region-based analysis and/or temporal smoothing are proposed, to solve the above-mentioned problems.

According to a first aspect of the present invention, an exemplary method for generating a target perspective model referenced for depth map generation is disclosed. The exemplary method includes: receiving a first input image; utilizing a region-based analysis unit for analyzing a plurality of regions in the first input image to extract image characteristics of the regions; and determining the target perspective model according to at least the image characteristics.

According to a second aspect of the present invention, an exemplary perspective model estimation apparatus for generating a target perspective model referenced for depth map generation is disclosed. The exemplary perspective model estimation apparatus includes a region-based analysis unit and a perspective model generation unit. The region-based analysis unit is arranged for receiving a first input image, and analyzing a plurality of regions in the first input image to extract image characteristics of the regions. The perspective model generation unit is arranged for determining the target perspective model according to at least the image characteristics.

According to a third aspect of the present invention, an exemplary method for generating a target perspective model referenced for depth map generation is disclosed. The exemplary method includes: receiving a first input image; determining a first perspective model in response to the first input image; and utilizing a perspective model generation unit for generating the target perspective model by a weighted sum of the first perspective model and at least one second perspective model.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The main concept of the present invention is to use region-based analysis and/or temporal smoothing to generate a perspective/global model referenced for depth map generation. Therefore, in accordance with the present invention, a fast and effective perspective/global model analysis method is used to generate a depth map to present the perspective of a scene. Besides, a simplified algorithm is employed to output a stable perspective/global model. As the proposed method uses a region-based analysis, the perspective/global model is generated with lower computational complexity. Moreover, the proposed temporal smoothing applied to the perspective/global model is capable of refining the perspective/global model to avoid judder of the generated depth map. Further details are described as below.

Figure 1:
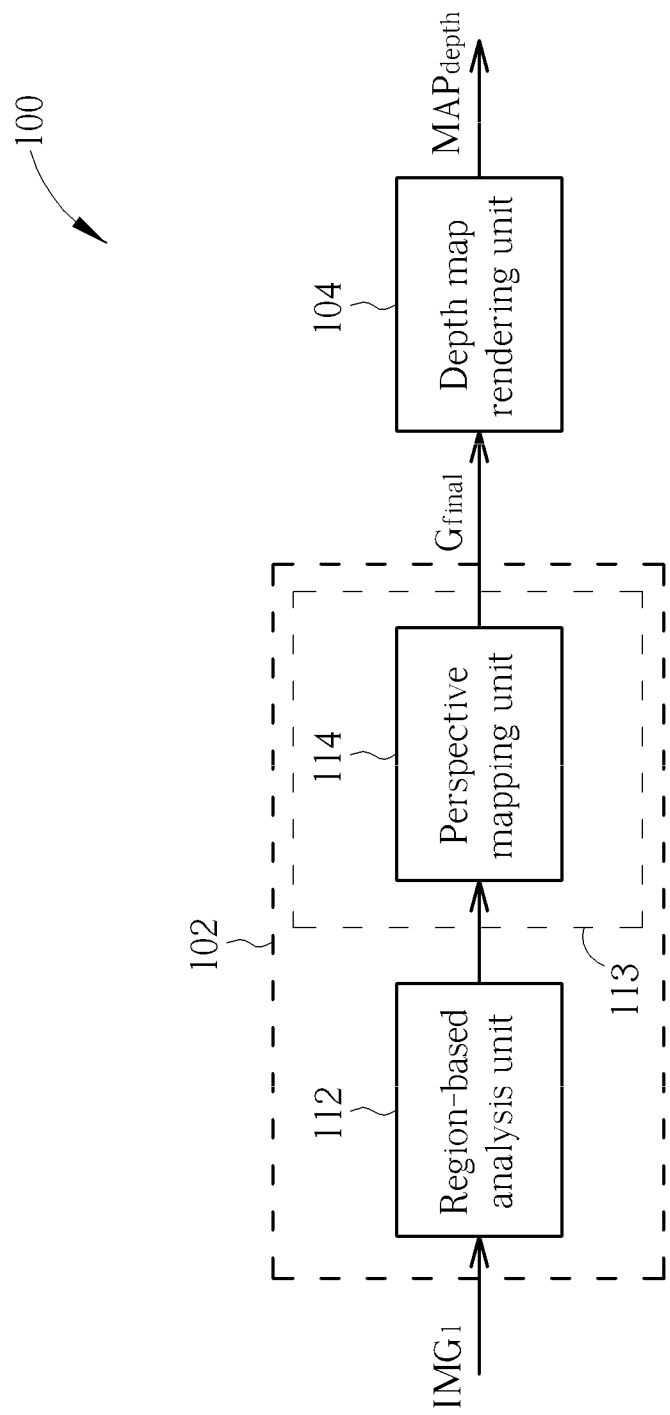
FIG. 1 is a block diagram illustrating a depth map generator according to a first embodiment of the present invention.

FIG. 1 is a block diagram illustrating a depth map generator according to a first embodiment of the present invention. The depth map generator 100 includes a perspective model estimation apparatus 102, and a depth map rendering unit 104 coupled to the perspective model estimation apparatus 102. The perspective model estimation apparatus 102 is arranged for generating a target/final perspective model $G_{final}$ for an input image $IMG_1$, and the depth map rendering unit 104 is arranged for referring to the target perspective model $G_{final}$ to create a corresponding depth map $MAP_{depth}$ for the input image $IMG_1$. As shown in FIG. 1, the perspective model estimation apparatus 102 includes a region-based analysis unit 112, and a perspective model generation unit 113 coupled to the region-based analysis unit 112, where the perspective model generation unit 113 in this embodiment may be simply implemented using a perspective mapping unit 114. The region-based analysis unit 112 is arranged for receiving the input image $IMG_1$, and analyzing a plurality of regions in the input image $IMG_1$ to extract image characteristics (i.e., local features) of the regions.

Figure 2:
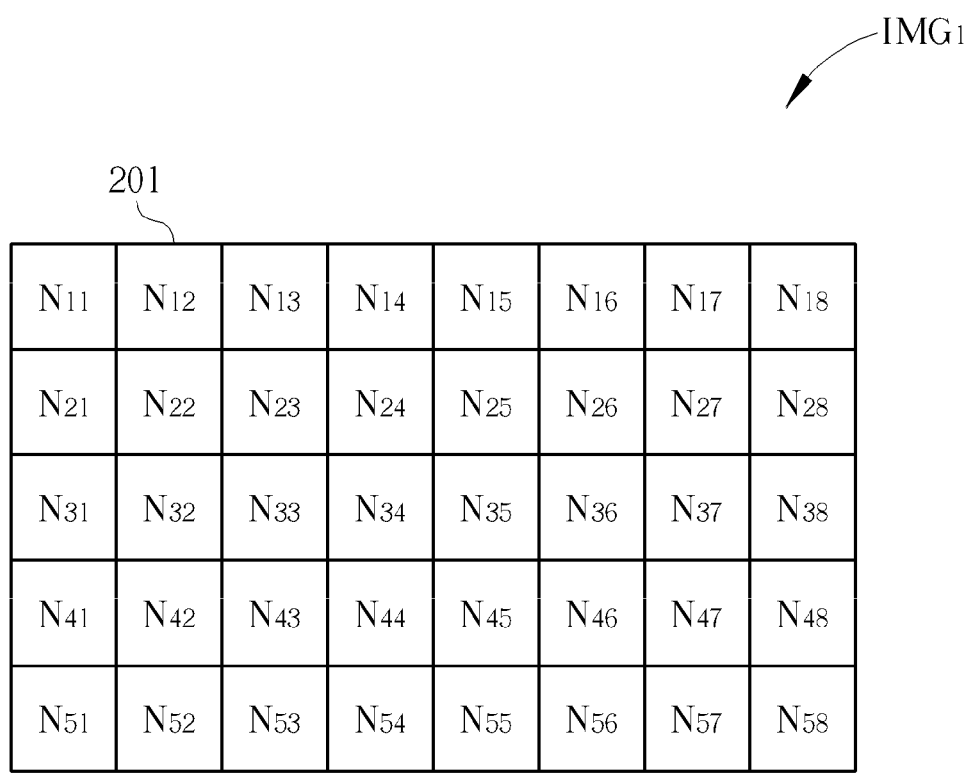
FIG. 2 is a diagram illustrating an exemplary result of the region-based analysis performed by a region-based analysis unit shown in FIG. 1.

Please refer to FIG. 2, which is a diagram illustrating an exemplary result of the region-based analysis performed by the region-based analysis unit 112. In this embodiment, the region-based analysis unit 112 divides the whole input image $IMG_1$ into a plurality of regions 201. By way of example, but not limitation, the size of each region 201 may be automatically set to the size of one macroblock. Alternatively, the size of each region 201 may be manually set by the user. For example, regions in the input image $IMG_1$ to be analyzed may be selected by a user-defined mask setting or a user-defined region of interest (ROI) setting. After the regions 201 are determined, the region-based analysis unit 112 analyzes the regions 201 to extract image characteristics $N_{11}$-$N_{58}$ of these regions 201. For example, each image characteristic may be a count number of edges found in each region. Hence, in one exemplary design, the region-based analysis unit 112 is configured to perform edge detection upon each region 201, and count edges detected in each region 201 to set an image characteristic of each region.

Figure 3:
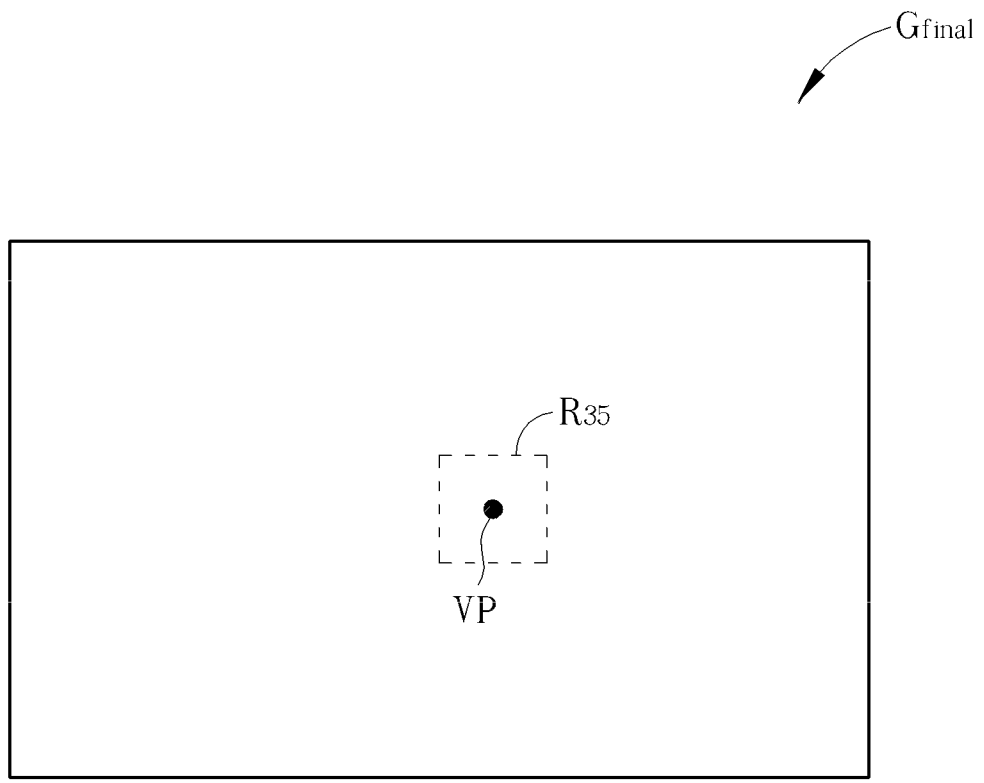
FIG. 3 illustrates that a center of a specific region acts as a feature point.

After the image characteristics $N_{11}$-$N_{58}$ of the regions 201 are obtained, the perspective mapping unit 114 of the perspective model generation unit 113 is operative to determine the target perspective model $G_{final}$ according to the image characteristics $N_{11}$-$N_{58}$. In this embodiment, the perspective mapping unit 114 selects a specific region with a specific image characteristic from the regions 201 of the input image $IMG_1$, and refers to the selected specific region to determine the target perspective model $G_{final}$. For example, the specific image characteristic of the selected specific region is a maximum image characteristic among the image characteristics of the regions. Specifically, in a case where each image characteristic is a count number of edges found in each region, the perspective mapping unit 114 therefore selects a region $R_{35}$ having a largest count number of detected edges (i.e., a maximum image characteristic $N_{35}$), and sets a feature point VP according to the selected region $R_{35}$. For example, as shown in FIG. 3, a center of the region $R_{35}$ may be used to serve as the feature point VP. Hence, the perspective mapping unit 114 maps the determined feature point VP to a perspective model, thereby creating the target perspective model $G_{final}$. In some or all embodiments of the present invention, the feature point may be regarded as a vanishing point. However, this is for illustrative purposes only, and is not meant to be a limitation of the present invention. For example, the feature point may be regarded as a point having a predefined image feature.

After the target perspective model $G_{final}$ is obtained, the depth map rendering unit 104 renders the depth map $MAP_{depth}$ in response to the target perspective model $G_{final}$. For example, the depth map rendering unit 104 may refer to the edge distribution of the input image $IMG_1$ and the feature point VP derived from a center of the region $R_{35}$ to render the depth map $MAP_{depth}$, where the feature point VP would have a smallest depth value which represents the farthest distance in the depth map $MAP_{depth}$.

In a case where the value of the accumulated horizontal edge components is greater than the value of accumulated vertical edge components, a conventional horizontal mode may be employed for rendering the depth map $MAP_{depth}$ such that the depth map $MAP_{depth}$ would be an image having gradient in the vertical direction. In another case where the value of the accumulated vertical edge components is greater than the value of accumulated horizontal edge components, a conventional vertical mode may be employed for rendering the depth map $MAP_{depth}$ such that the depth map $MAP_{depth}$ would be an image having gradient in the horizontal direction. In yet another case where the value of the accumulated horizontal edge components is similar/identical to the value of accumulated vertical edge components, a conventional circle/perspective mode may be employed for rendering the depth map $MAP_{depth}$ such that the depth map $MAP_{depth}$ would be an image having gradient in the radial direction. As the present invention focuses on the derivation of the perspective/global model referenced for depth map generation, further description of the depth map rendering unit 104 is omitted here for brevity.

The perspective model estimation apparatus 102 shown in FIG. 1 may be used to generate a perspective model for a single input image. In other words, the perspective model estimation apparatus 102 may generate a perspective model for each input image without referring to information propagated from previous/future image(s). Though the region-based analysis is capable of quickly finding the feature point with low computational complexity, the feature point may jump between images and thus lead to judder perceived on the resulting depth maps. To produce a more stable feature point, the present invention further proposes applying temporal smoothing to the perspective model.

Figure 4:
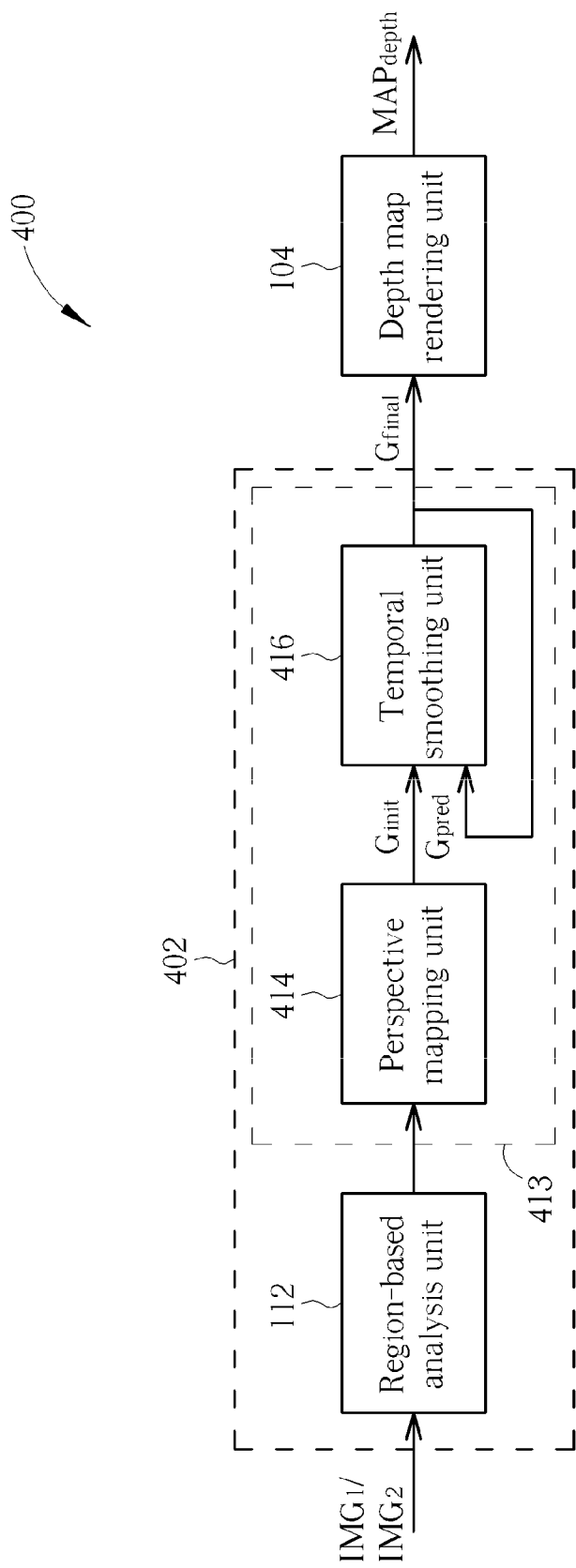
FIG. 4 is a block diagram illustrating a depth map generator according to a second embodiment of the present invention.

Please refer to FIG. 4, which is a block diagram illustrating a depth map generator according to a second embodiment of the present invention. The depth map generator 400 includes a perspective model estimation apparatus 402 and the aforementioned depth map rendering unit 104. The perspective model estimation apparatus 402 is arranged for generating a target perspective model $G_{final}$ for an input image $IMG_1$, and the depth map rendering unit 104 is arranged for referring to the target perspective model $G_{final}$ to create a corresponding depth map $MAP_{depth}$ for the input image $IMG_1$. As shown in FIG. 4, the perspective model estimation apparatus 402 includes the aforementioned region-based analysis unit 112, and a perspective model generation unit 413 coupled to the region-based analysis unit 112, where the perspective model generation unit 413 in this embodiment includes a perspective mapping unit 414 and a temporal smoothing unit 416.

The major difference between the perspective model estimation apparatuses 102 and 402 is the perspective model generation unit 413 that supports temporal smoothing. The operation of the perspective mapping unit 414 is similar to that of the perspective mapping unit 114. However, the output of the perspective mapping unit 114 directly acts as the target/final perspective model $G_{final}$ of the perspective mapping unit 114, and the output of the perspective mapping unit 414 acts as an initial perspective model $G_{init}$ to be further processed by the following temporal smoothing unit 416.

For example, the feature point VP derived from the image characteristics obtained by the region-based analysis unit 112 may act as an initial feature point, and the perspective mapping unit 414 maps the initial feature point to the initial perspective model $G_{init}$. Next, the temporal smoothing unit 416 is operative to generate the target/final perspective model $G_{final}$ by a weighted sum of the initial perspective model $G_{init}$ and at least one another predicted perspective model $G_{pred}$. For example, as shown in FIG. 4, the at least one another predicted perspective model $G_{pred}$ is a target/final perspective model generated by the perspective model estimation apparatus 402 through processing another input image $IMG_2$, where the input image $IMG_2$ may precede or follow the input image $IMG_1$ in accordance with actual design consideration. However, the above is for illustrative purposes only, and is not meant to be a limitation of the present invention. For example, in an alternative design, the at least one another predicted perspective model $G_{pred}$ may be derived from using any conventional perspective model generation algorithms.

In this embodiment, the temporal smoothing unit 416 is capable of referring to information propagated from previous or further input image(s) to refine the initial perspective model $G_{init}$ into the target perspective model $G_{final}$, thereby avoiding judder of the depth map $MAP_{depth}$ rendered according to the target perspective model $G_{final}$. For example, the temporal smoothing unit 416 may be implemented using a smoothing filter operative to make the feature point have a smooth transition in different images, where coefficients (e.g., weighting factors) of the smoothing filter are set by constants or adjusted in response to the image contents (e.g., the number of edges) or user preference. An exemplary temporal smoothing operation performed by the temporal smoothing unit 416 may be expressed using the following equation.

$$G_{final}(t_1) = W_{curr} * G_{init}(t_1) + W_{prev} * G_{final}(t_0) \quad (1)$$

In above equation (1), $G_{final}(t_1)$ represents the final perspective model generated by the temporal smoothing unit 416 at time $t_1$, $G_{init}(t_1)$ represents the initial perspective model generated by the perspective mapping unit 414 at time $t_1$, $G_{final}(t_0)$ represents the other predicted perspective model $G_{pred}$ which is generated by the temporal smoothing unit 416 at time $t_0$, and $W_{curr}$ and $W_{prev}$ are weighting factors.

As the feature point is mapped to a perspective model, the locations of the feature point obey the following equation accordingly.

$$P_1' = W_{curr} * P_1 + W_{prev} * P_0' \quad (2)$$

Figure 5:
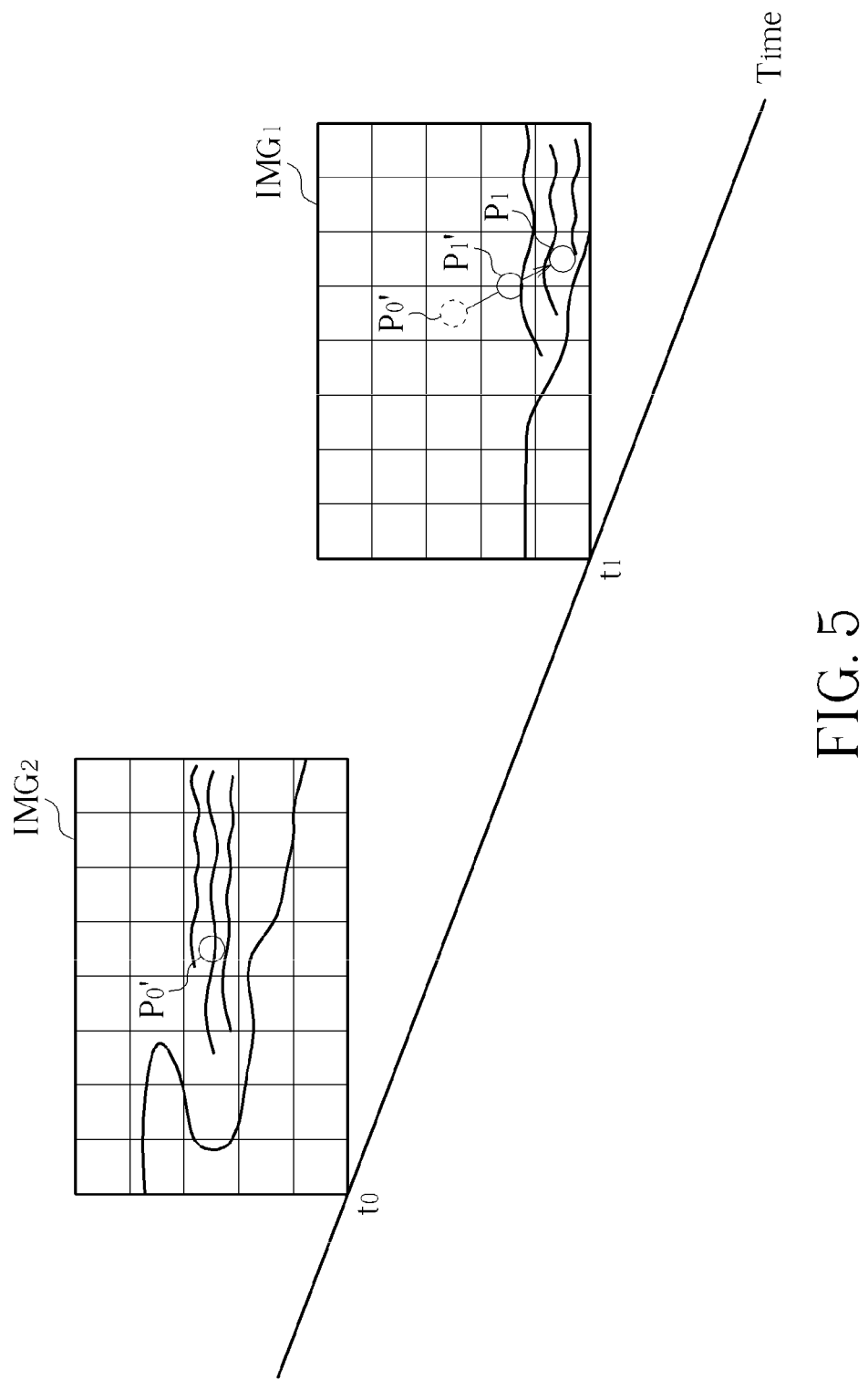
FIG. 5 is a diagram illustrating an exemplary temporal smoothing operation performed by a temporal smoothing unit shown in FIG. 4.

In above equation (2), $P_1'$ represents the final feature point at time $t_1$, $P_1$ represents the initial feature point at time $t_1$, and $P_0'$ represents the final feature point at time $t_0$. Please refer to FIG. 5, which is a diagram illustrating an exemplary temporal smoothing operation performed by the temporal smoothing unit 416. As can be seen from FIG. 5, the temporal smoothing between the previous perspective model (e.g., $G_{final}(t_0)$) and the current perspective model (e.g., $G_{init}(t_1)$) makes the feature point have a smooth transition from $P_0'$ to $P_1$, thereby avoiding an instable feature point. In this way, the smoothness of the perspective model is ensured to avoid visual fatigue while doing the 2D-to-3D conversion.

The aforementioned temporal smoothing operation is for illustrative purposes only, and is not meant to be a limitation of the present invention. That is, using other weighting function to realize the temporal smoothing operation is feasible. For example, another exemplary temporal smoothing operation performed by the temporal smoothing unit 416 may be expressed using the following equation.

$$G_{final}(t_1) = W_{curr} * G_{init}(t_1) + W_{adj} * G_{adj}(t_1) + W_{prev} * G_{final}(t_0) \quad (3)$$

In above equation (3), $G_{adj}(t_1)$ represents an adjusted perspective model at time $t_1$, and $W_{adj}$ is a weighting factor. The same objective of generating a target/final perspective model through temporal smoothing is achieved.

Figure 6:
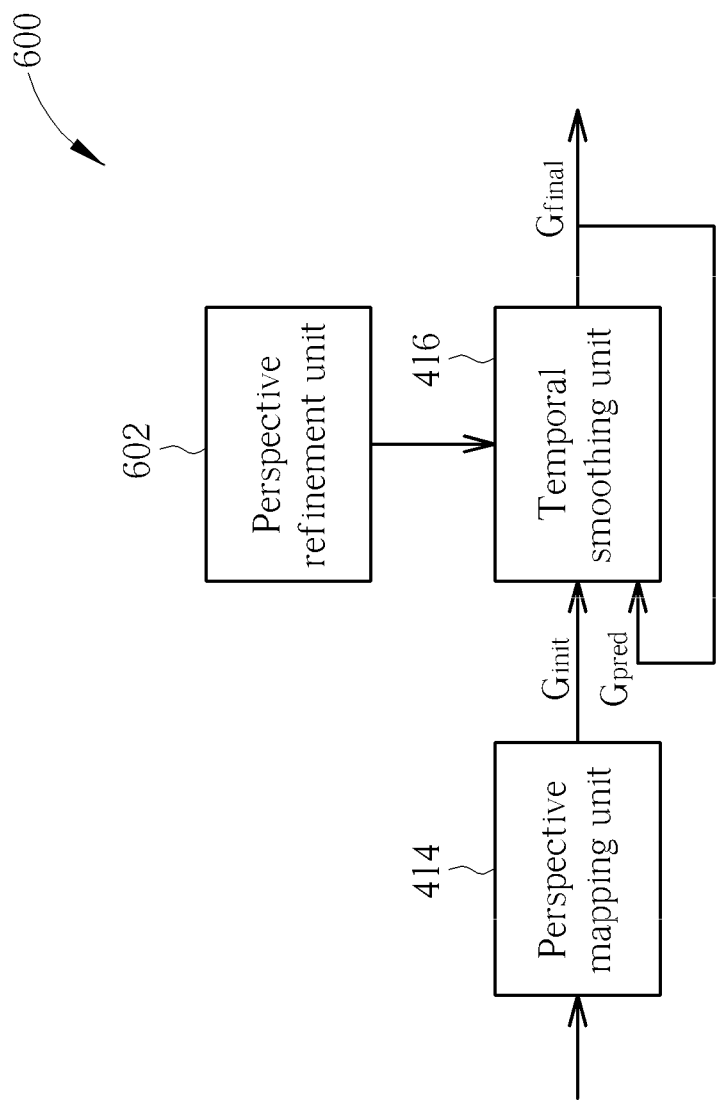
FIG. 6 is a diagram illustrating an alternative design of a perspective model generation unit according to the present invention.

In one exemplary design, the weighting factors (e.g., $W_{curr}$, $W_{prev}$ and/or $W_{adj}$) used for temporal smoothing may be constants. Alternatively, the weighting factors (e.g., $W_{curr}$, $W_{prev}$ and/or $W_{adj}$) used for temporal smoothing may be set according to image characteristics/image contents. FIG. 6 is a diagram illustrating an alternative design of the perspective model generation unit. As shown in FIG. 6, the perspective model generation unit 600 includes a perspective refinement unit 602 and the aforementioned perspective mapping unit 414 and temporal smoothing unit 416. The perspective refinement unit 602 is coupled to the temporal smoothing unit 416, and arranged for setting weighting factors of the initial perspective model $G_{init}$ and the at least one predicted perspective model $G_{pred}$ according to image characteristics of the input image $IMG_1$.

Figure 7:
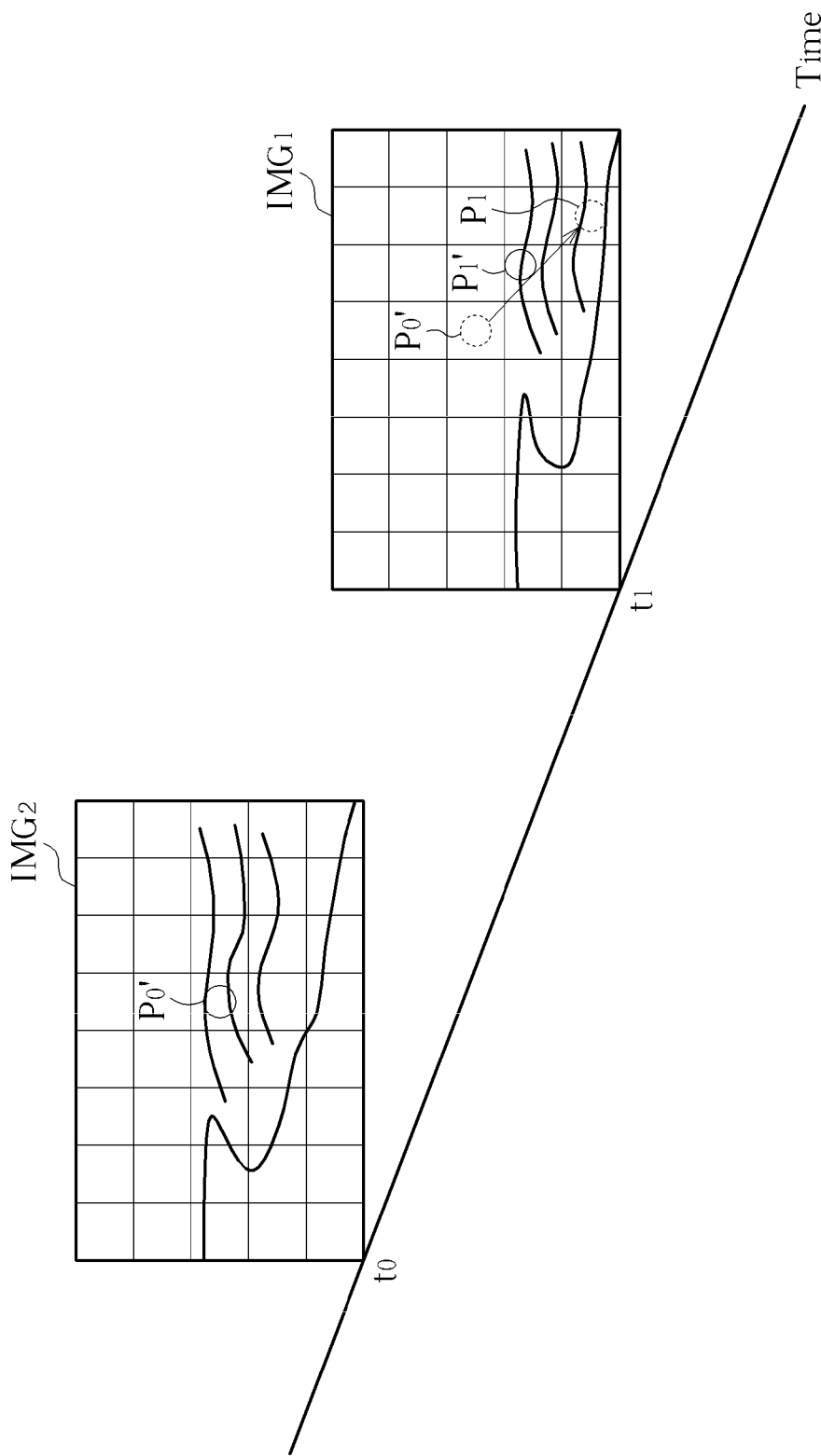
FIG. 7 is a diagram illustrating that a feature point is refined to an edge boundary for fitting an input image.

For example, the perspective refinement unit 602 sets the weighting factors of the initial perspective model $G_{init}$ and the at least one predicted perspective model $G_{pred}$ make the target perspective model $G_{final}$ fit into an edge boundary in the input image $IMG_1$, where in one exemplary design, the perspective refinement unit 602 may set the weighting factors through utilizing a bilateral based weighting function or a guided image filter. With a proper setting of the weighting factors (e.g., $W_{curr}$, $W_{prev}$ and/or $W_{adj}$), the final feature point $P_1'$ is refined to an edge boundary to fit the pixel-level image details of the input image $IMG_1$, as shown in FIG. 7. In this way, the target perspective model $G_{final}$ would have higher precision.

Figure 8:
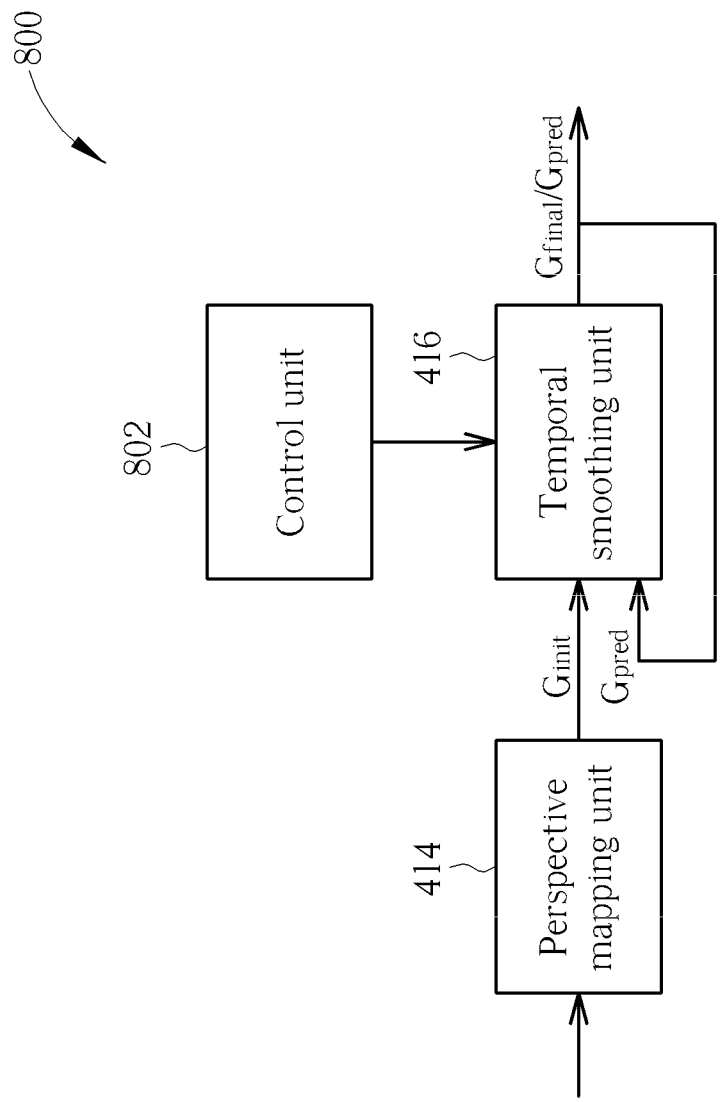
FIG. 8 is a diagram illustrating another alternative design of a perspective model generation unit according to the present invention.

Besides, the temporal smoothing may also be implemented with a Schmitt trigger-like filter to avoid sudden noise of the initial perspective model. Please refer to FIG. 8, which is a diagram illustrating another alternative design of the perspective model generation unit. As shown in FIG. 8, the perspective model generation unit 800 includes a control unit 802 and the aforementioned perspective mapping unit 414 and temporal smoothing unit 416. The control unit 802 is coupled to the temporal smoothing unit 416, and arranged for detecting similarity of successive target perspective models that are previously produced prior to producing a current perspective model for a current input image.

Figure 9:
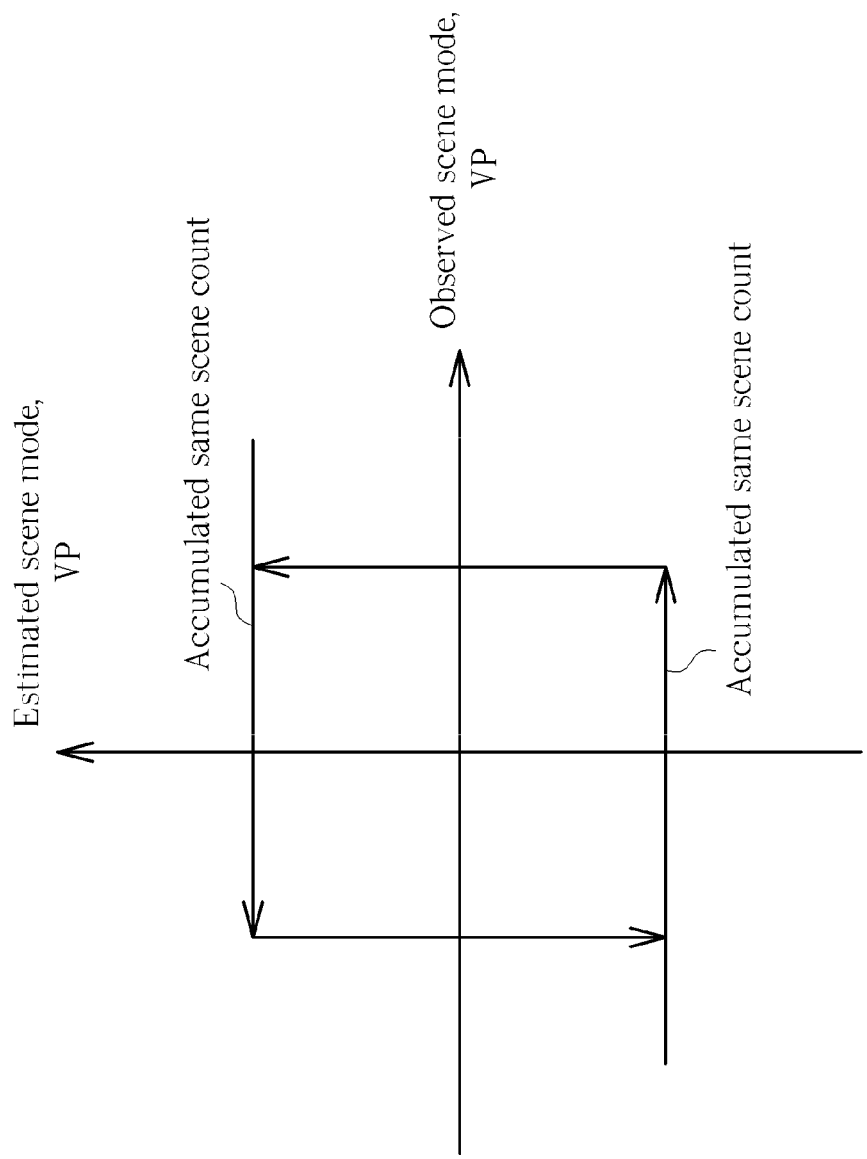
FIG. 9 is a diagram illustrating an exemplary Schmitt trigger-like filtering employed by a perspective model generation unit.

For example, the control unit 802 may be implemented using a Schmitt trigger-like filter for accumulating a count number of successive same/similar target perspective models that are previously produced. When the control unit 802 indicates that the similarity satisfies a predetermined criterion (e.g., the count number is greater than a predetermined threshold), the temporal smoothing unit 416 is allowed to generate the target perspective model $G_{final}$ by using the aforementioned temporal smoothing (i.e., a weighted sum of the initial perspective model $G_{init}$ and the at least one detected perspective model $G_{pred}$). When the control unit 802 indicates that the similarity does not satisfy the predetermined criterion (e.g., the count number is not greater than the predetermined threshold), the perspective model generation unit 800 may directly utilize a previous target perspective model (e.g., $G_{pred}$) as the target perspective model $G_{final}$. An exemplary Schmitt trigger-like filtering employed by the perspective model generation unit 800 is illustrated in FIG. 9. To put it simply, a counting procedure may be used before the temporal smoothing. The counting procedure detects that same/similar perspective models have been produced successively, and then the temporal smoothing is allowed to be started.

It should be noted that part or all of the technical features proposed in the exemplary perspective model generation units 413, 600 and 800 may be employed in one perspective model generation unit, depending upon actual design requirement/consideration.

Figure 10:
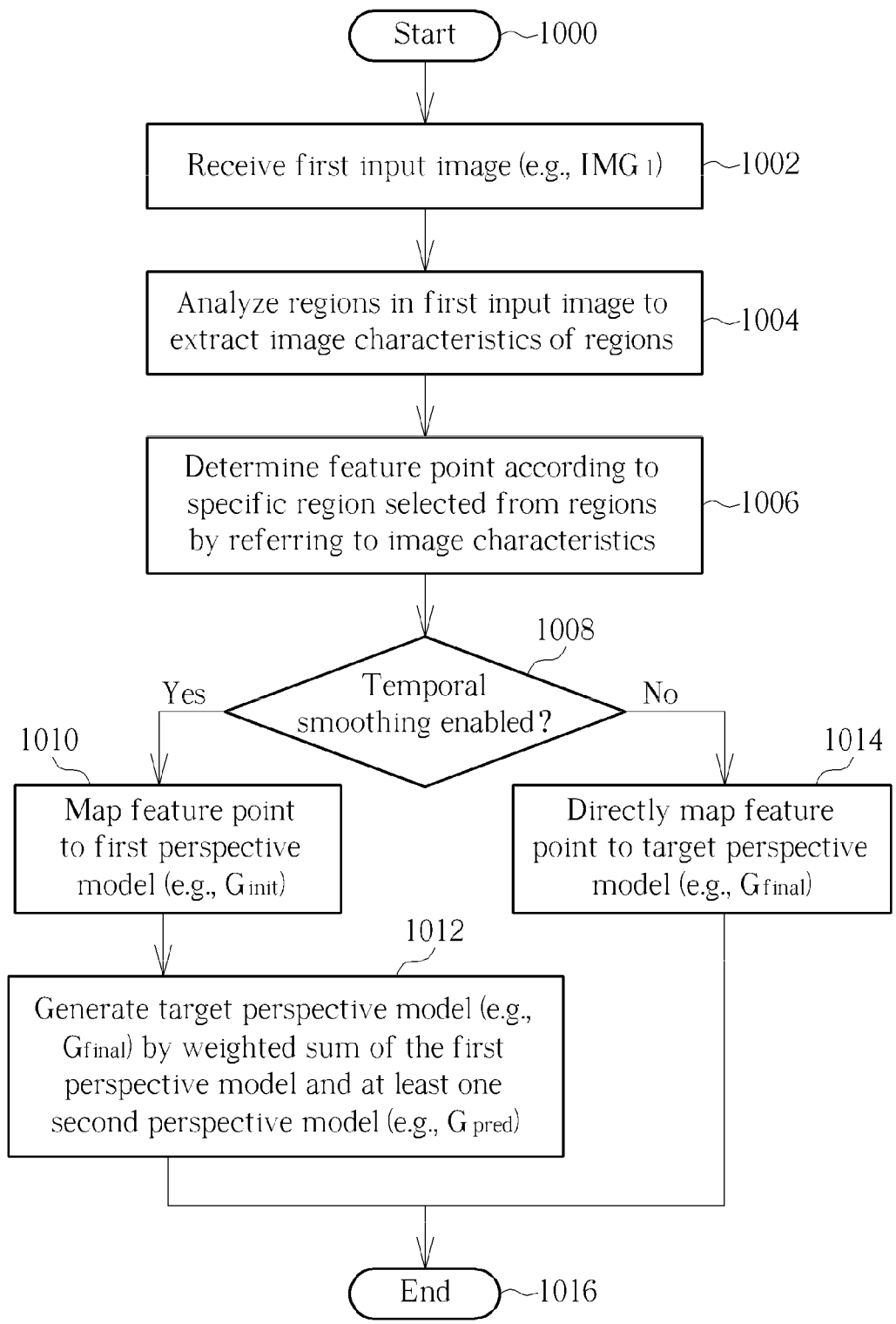
FIG. 10 is a flowchart illustrating a method for generating a target perspective model referenced for depth map generation according to an embodiment of the present invention.

FIG. 10 is a flowchart illustrating a method for generating a target perspective model referenced for depth map generation according to an embodiment of the present invention. If the result is substantially the same, the steps are not required to be executed in the exact order shown in FIG. 10. The method may be employed by the aforementioned perspective model estimation apparatus, and may be summarized as below.

Step 1000: Start.

Step 1002: Receive a first input image (e.g., $IMG_1$).

Step 1004: Analyze a plurality of regions in the first input image to extract image characteristics of the regions.

Step 1006: Determine a feature point according to a specific region selected from the regions by referring to the image characteristics. For example, a region having a largest number of edges included therein is selected, and a center of the selected region serves as the feature point.

Step 1008: Is temporal smoothing enabled? If yes, go to step 1010; otherwise, go to step 1014.

Step 1010: Map the feature point to a first perspective model (e.g., $G_{init}$).

Step 1012: Generate the target perspective model (e.g., $G_{final}$) by a weighted sum of the first perspective model and at least one second perspective model (e.g., $G_{pred}$) For example, the at least one second perspective model may be derived from processing a second input image (e.g., $IMG_2$) preceding or following the first input image. Go to step 1016.

Step 1014: Directly map the feature point to the target perspective model (e.g., $G_{final}$).

Step 1016: End.

As a person skilled in the art can readily understand the operation of each step shown in FIG. 10 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a target perspective model referenced for depth map generation, comprising:
   receiving a first input image;
   utilizing a region-based analysis circuit for analyzing a plurality of regions in the first input image to extract image characteristics of the regions; and
   determining the target perspective model of the first input image according to at least the image characteristics, comprising:
   selecting a specific region with a specific image characteristic from the regions of the first input image;
   referring to at least the selected specific region to determine a first perspective model; and
   when temporal smoothing is performed, generating the target perspective model by a weighted sum of the first perspective model and at least one second perspective model, wherein the target perspective model is not a depth map of the first input image, and the depth map, the target perspective model and the image characteristics are generated for a same single image.

2. The method of claim 1, wherein analyzing the regions in the first input image comprises:
   performing edge detection upon each region; and
   counting edges detected in each region to set an image characteristic of each region.

3. The method of claim 1, wherein the specific image characteristic of the selected specific region is a maximum image characteristic among the image characteristics of the regions.

4. The method of claim 1, wherein referring to at least the selected specific region to determine the first perspective model comprises:
   setting an initial feature point according to the specific region; and
   determine the first perspective model according to at least the initial feature point.

5. The method of claim 4, wherein determining the first perspective model according to at least the initial feature point comprises:
   mapping the initial feature point to the first perspective model.

6. The method of claim 5, wherein the at least one second perspective model is predicted from processing a second input image preceding or following the first input image.

7. The method of claim 5, wherein weighting factors of the first perspective model and the at least one second perspective model are configured according to image characteristics of the first input image.

8. The method of claim 5, wherein weighting factors of the first perspective model and the at least one second perspective model are configured to make the target perspective model fit into an edge boundary in the first input image.

9. The method of claim 5, wherein weighting factors of the first perspective model and the at least one second perspective model are configured by utilizing a bilateral based weighting function or a guided image filter.

10. The method of claim 4, wherein determining the first perspective model according to at least the initial feature point comprises:
  mapping the initial feature point to the first perspective model; and
  determining the target perspective model of the first input image according to at least the image characteristics further comprises:
  detecting similarity of successive target perspective models that are previously produced;
  wherein the temporal smoothing is performed when the similarity satisfies a predetermined criterion.

11. The method of claim 10, wherein determining the target perspective model of the first input image according to at least the image characteristics further comprises:
  when the similarity does not satisfy the predetermined criterion, directly utilizing a previous perspective model as the target perspective model.

12. A perspective model estimation apparatus for generating a target perspective model referenced for depth map generation, comprising:
  a region-based analysis circuit, arranged for receiving a first input image, and analyzing a plurality of regions in the first input image to extract image characteristics of the regions; and
  a perspective model generation circuit, arranged for determining the target perspective model of the first input image according to at least the image characteristics, wherein the perspective model generation circuit selects a specific region with a specific image characteristic from the regions of the first input image, and refers to at least the selected specific region to determine a first perspective model; when temporal smoothing is performed, the perspective model generation circuit generates the target perspective model by a weighted sum of the first perspective model and at least one second perspective model; the target perspective model is not a depth map of the first input image, and the depth map, the target perspective model and the image characteristics are generated for a same single image.

13. The perspective model estimation apparatus of claim 12, wherein the region-based analysis circuit performs edge detection upon each region, and counts edges detected in each region to set an image characteristic of each region.

14. The perspective model estimation apparatus of claim 12, wherein the specific image characteristic of the selected specific region is a maximum image characteristic among the image characteristics of the regions.

15. The perspective model estimation apparatus of claim 12, wherein the perspective model generation circuit sets an initial feature point according to the specific region, and determines the first perspective model according to at least the initial feature point.

16. The perspective model estimation apparatus of claim 15, wherein the perspective model generation circuit comprises:
  a perspective mapping circuit, arranged for mapping the initial feature point to the first perspective model; and
  a temporal smoothing circuit, arranged for performing the temporal smoothing.

17. The perspective model estimation apparatus of claim 16, wherein the at least one second perspective model is predicted by the perspective model estimation apparatus through processing a second input image preceding or following the first input image.

18. The perspective model estimation apparatus of claim 16, wherein the perspective model generation circuit further comprises:
  a perspective refinement circuit, arranged for setting weighting factors of the first perspective model and the at least one second perspective model according to image characteristics of the first input image.

19. The perspective model estimation apparatus of claim 16, wherein the perspective model generation circuit further comprises:
  a perspective refinement circuit, arranged for setting weighting factors of the first perspective model and the at least one second perspective model to make the target perspective model fit into an edge boundary in the first input image.

20. The perspective model estimation apparatus of claim 16, wherein the perspective model generation circuit further comprises:
  a perspective refinement circuit, arranged for setting weighting factors of the first perspective model and the at least one second perspective model through utilizing a bilateral based weighting function or a guided image filter.

21. The perspective model estimation apparatus of claim 15, wherein the perspective model generation circuit comprises:
  a perspective mapping circuit, arranged for mapping the initial feature point to the first perspective model;
  a control circuit, arranged for detecting similarity of successive target perspective models that are previously produced; and
  a temporal smoothing circuit, arranged for performing the temporal smoothing when the control circuit indicates that the similarity satisfies a predetermined criterion.

22. The perspective model estimation apparatus of claim 21, wherein when the control circuit indicates that the similarity does not satisfy the predetermined criterion, the perspective model generation circuit directly utilizes a previous perspective model as the target perspective model.

23. A method for generating a target perspective model referenced for depth map generation, comprising:
  receiving a first input image;
  determining a first perspective model in response to the first input image; and
  utilizing a perspective model generation circuit for generating the target perspective model of the first input image by a weighted sum of the first perspective model of the first input image and at least one second perspective model of at least one second input image, wherein each of the first perspective model and the target perspective model is not a depth map of the first input image.

24. The method of claim 23, wherein the at least one second perspective model is predicted from processing a second input image preceding or following the first input image.

25. The method of claim 23, wherein weighting factors of the first perspective model and the at least one second perspective model are configured according to image characteristics of the first input image.

26. The method of claim 23, wherein weighting factors of the first perspective model and the at least one second perspective model are configured to make the target perspective model fit into an edge boundary in the first input image.

27. The method of claim 23, wherein weighting factors of the first perspective model and the at least one second perspective model are configured by utilizing a bilateral based weighting function or a guided image filter.

* * * * *